(12) United States Patent
Mayer et al.

(10) Patent No.: US 11,132,159 B2
(45) Date of Patent: Sep. 28, 2021

(54) PRINT CACHING

(71) Applicant: Hewlett-Packard Development Company, L.P., Spring, TX (US)

(72) Inventors: Brian C Mayer, Boise, ID (US); Kenneth K Smith, Boise, ID (US); Mark J Wibbels, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 62 days.

(21) Appl. No.: 16/499,038

(22) PCT Filed: Apr. 25, 2017

(86) PCT No.: PCT/US2017/029386
§ 371 (c)(1),
(2) Date: Sep. 27, 2019

(87) PCT Pub. No.: WO2018/199930
PCT Pub. Date: Nov. 1, 2018

(65) Prior Publication Data
US 2021/0109689 A1 Apr. 15, 2021

(51) Int. Cl.
*G06F 3/12* (2006.01)
*H04W 4/029* (2018.01)
*G06F 21/60* (2013.01)

(52) U.S. Cl.
CPC ............ *G06F 3/126* (2013.01); *G06F 3/1222* (2013.01); *G06F 3/1231* (2013.01); *G06F 3/1238* (2013.01); *G06F 3/1288* (2013.01); *G06F 21/608* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 7,535,583 B2 | 5/2009 | Sesek et al. | |
| 7,839,521 B2 | 11/2010 | Bard et al. | |
| 8,346,903 B2 | 1/2013 | Shepherd | |
| 8,493,605 B2 | 7/2013 | Wada | |
| 9,047,541 B2 | 6/2015 | Kavanapillil et al. | |
| 9,058,138 B2 | 6/2015 | St. Laurent | |
| 2002/0145748 A1* | 10/2002 | Nonoyama | G06K 15/00 358/1.14 |
| 2002/0198991 A1 | 12/2002 | Gopalakrishnan et al. | |

(Continued)

OTHER PUBLICATIONS

Ward, A. et al., A New Location Technique for the Active Office, Aug. 6, 2002, http://ieeexplore.ieee.org/ ~ 2 pages.

*Primary Examiner* — Frantz Bataille
(74) *Attorney, Agent, or Firm* — HP Inc. Patent Department

(57) ABSTRACT

An example system includes a client interface to receive a print job from a client device, wherein the print job includes a user identifier (UID) and a current user location. The example system further includes a controller having an adaptive caching portion to determine that the current user location is a new user location for the UID, identify at least one printer identifier (PID) associated with the new user location, and associate the UID with the new user location and the at least one PID. The system further includes a printer interface to adaptively cache the print job in its entirety at least at one printer corresponding to the at least one PID.

20 Claims, 5 Drawing Sheets

(56) References Cited

U.S. PATENT DOCUMENTS

| | | |
|---|---|---|
| 2012/0188605 A1 | 7/2012 | Masahiro |
| 2014/0240756 A1 | 8/2014 | Ganesan |
| 2014/0368865 A1* | 12/2014 | Gutnik .................. G06F 3/1267 358/1.15 |
| 2015/0070719 A1* | 3/2015 | Kuribara ............... G06F 3/1238 358/1.13 |
| 2017/0060503 A1 | 3/2017 | Tomihisa |

* cited by examiner

PRINT CACHING

BACKGROUND

Some networks may allow a user to send a print job to a print server from a computer terminal or other client device, and to subsequently pull the print job from the print server by entering user authentication data at a network printer. Other networks may detect the location of a user's client device and may automatically push a portion of the print job to a plurality of printers previously associated with the user's location.

BRIEF DESCRIPTION OF THE DRAWINGS

For a more complete understanding of various examples, reference is now made to the following description taken in connection with the accompanying drawings in which.

DETAILED DESCRIPTION

Various examples described herein relate to print caching based on a user's location or a user's predicted location. Various examples include a system for receiving a print job from a client device, where the print job includes a user identifier and information on the current location of the user. If the system determines that the user is in a new location not previously associated with the user, the system identifies at least one printer associated with the new user location and creates a new association between the user, the new user location, and the printers. The system may cache a complete copy of the print job at each of the printers, if there is sufficient local storage space, where the print job is held until the user authenticates him/herself at one of the printers. In one example, absent sufficient local storage space, a partial copy of the print job may be stored at the printers.

In other examples, the system may predict a "next location" of the user, based for example, on the current location of the user and a user's location history, and to cache the entire print job at printers associated with the predicted user location if there is sufficient local storage at the printer. In one example, the next location of the user may be predicted by accessing meeting information from the user's calendar application to determine pre-scheduled user locations. In these examples, the system may cache the print job to printers associated with the pre-scheduled user locations.

Caching the print jobs at the printers in this way, in response to a new user location or a predicted location, and available storage is referred to herein as "adaptively caching" the print job, or creating an "adaptive cache." Accordingly, the present disclosure describes example systems, methods and articles of manufacture (e.g., computer readable media) to facilitate the adaptive caching of print jobs.

Figure 1:
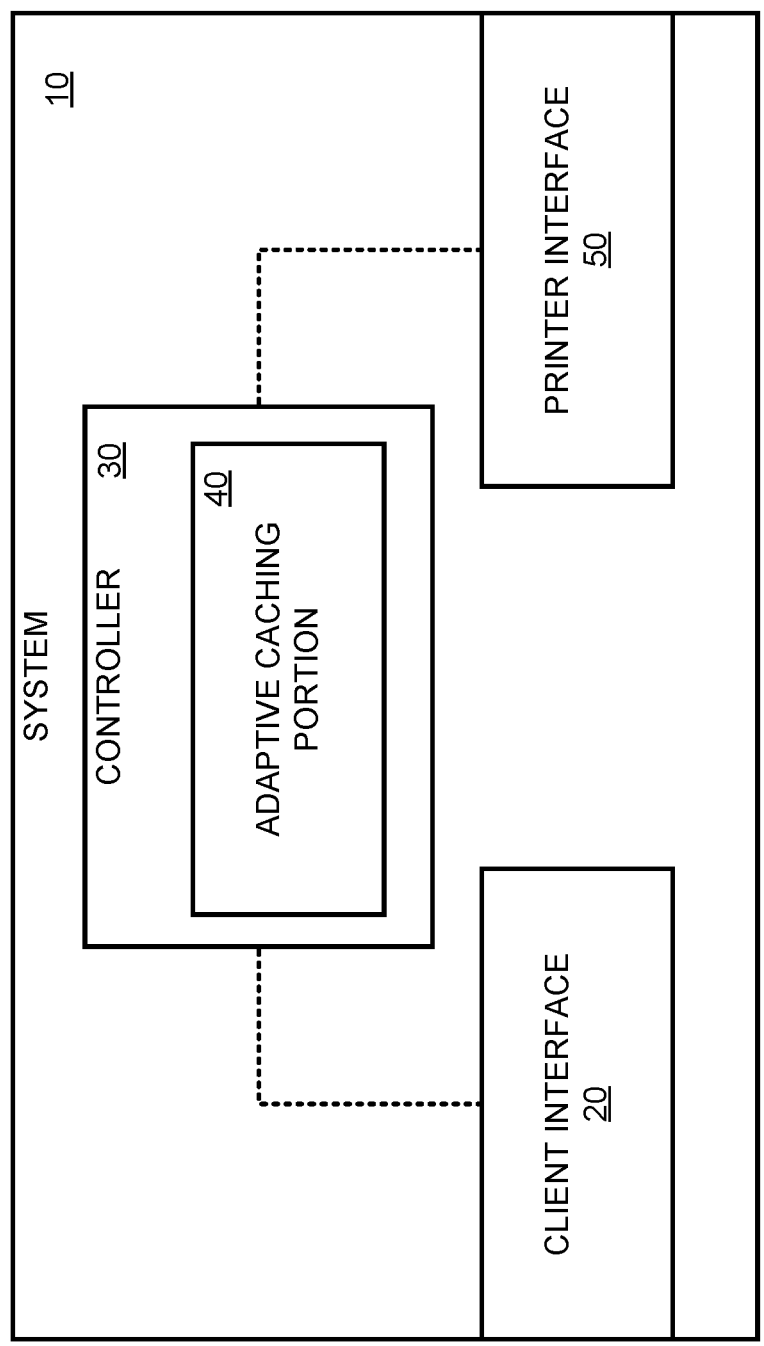
FIG. 1 illustrates a block diagram of an example system for adaptive print caching.

Referring now to the Figures, FIG. 1 illustrates a block diagram of an example system for adaptive print caching. The example system 10 of FIG. 1 includes a client interface 20 to receive a print job from a client device (not shown). In various examples, the print job received from the client device includes a user identifier (UID) and a current user location.

The example system 10 of FIG. 1 further includes a controller 30. In various examples, the controller 30 is coupled to the client interface 20 and may be implemented as hardware, software, firmware or a combination thereof. In one example, the controller 30 may be a processor, such as a central processing unit (CPU) of a computing device, for example. In the example system 10 of FIG. 1, the controller 30 is provided with an adaptive caching portion 40. The adaptive caching portion 40 may be implemented as logic in a processor, for example. In the example system 10 of FIG. 1, the adaptive caching portion 40 may be provided to determine that the current user location is a new user location for the UID. In various examples, based on this determination, the adaptive caching portion 40 may identify at least one printer identifier (PID) associated with the new user location, and associate the UID with the new user location and the at least one PID.

The example system 10 of FIG. 1 further includes a printer interface 50. The printer interface 50 is coupled to the controller 30 and may allow the example system 10 to be communicatively coupled to at least one printer (not shown in FIG. 1). The printer interface 50 may adaptively cache the print job in its entirety at the at least one printer corresponding to the at least one PID.

Figure 2:
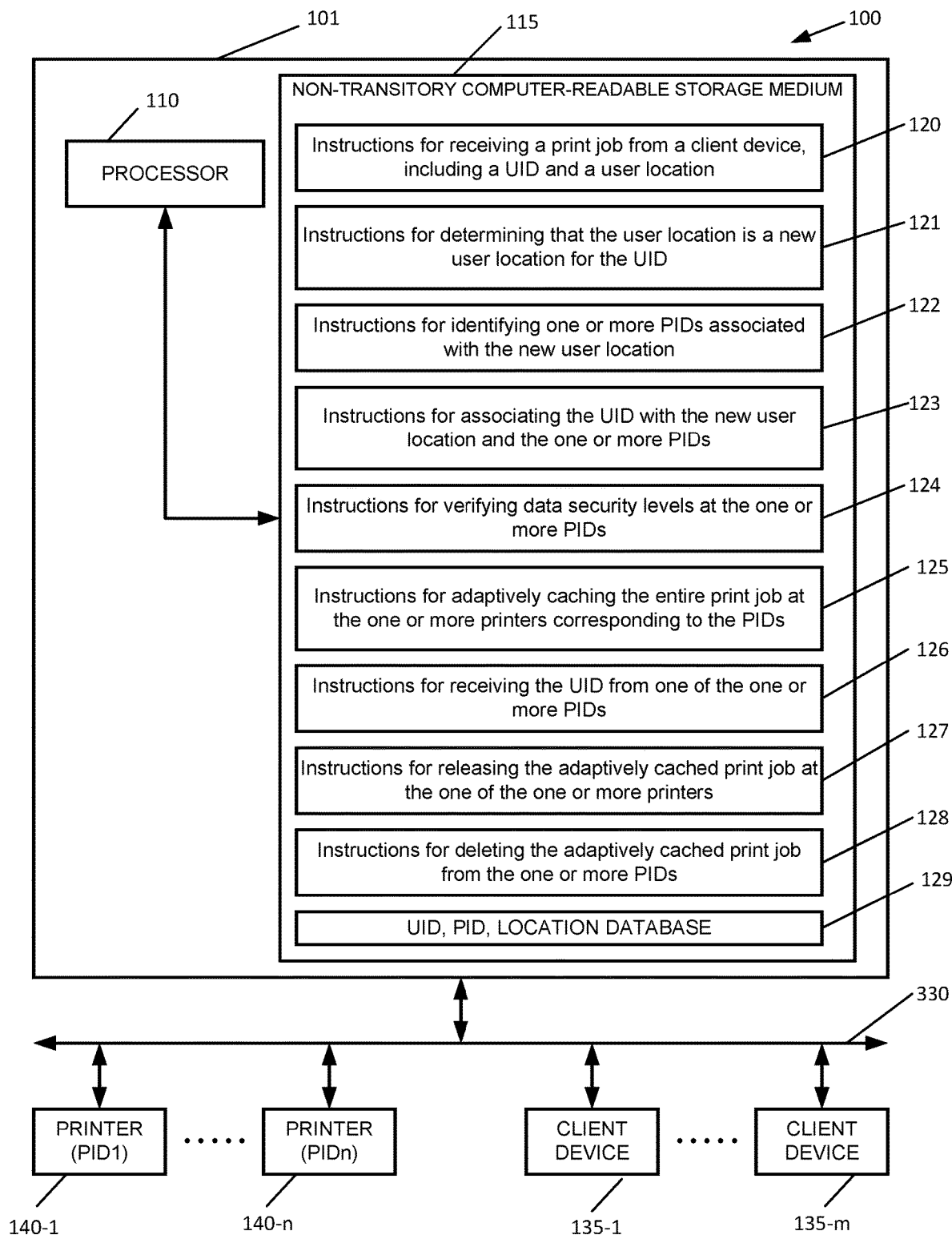
FIG. 2 illustrates a block diagram of another example system with a computer-readable storage medium including instructions executable by a processor for adaptive print caching.

Referring now to FIG. 2, a block diagram of an example system is illustrated with a non-transitory computer-readable storage medium including instructions executable by a processor for adaptive print caching. The example system 100 includes a print server 101 comprising a processor 110 coupled with a non-transitory computer-readable storage medium 115. The non-transitory computer-readable storage medium 115 includes example instructions 120-128 executable by the processor 110 to perform various functionalities described herein. The non-transitory computer-readable storage medium 115 may also store a database, such as database 129 in FIG. 2, described herein. In various examples, the non-transitory computer-readable storage medium 115 may be any of a variety of storage devices including, but not limited to, random-access memory (RAM), dynamic RAM (DRAM), static RAM (SRAM), flash memory, read-only memory (ROM), programmable ROM (PROM), electrically erasable PROM (EEPROM), or the like. In various examples, the processor 110 may be a general purpose processor, special purpose logic, or the like.

System 100 may also include a network 130 to connect print server 101 with other network components such as, for example, a plurality of client devices 135-1 through 135-$m$ and a plurality of printers 140-1 through 14-$n$, where m and n are integers representing, respectively, the total number of client devices 135 and the total number of printers 140 on the network, which may vary from time-to-time. Network 130 may be any kind of network such as a wired or wireless local area network (LAN), a wired or wireless wide area network (WAN), a wired or wireless metropolitan area network (MAN), a satellite network, a cellular network or any other network or combination thereof. Client devices 130 may be any type of network connected computer terminal or computing device such as a desktop or laptop computer, tablet device, cell phone, or the like. Printers 140 may be any type of network connected printing device associated with print server 101.

In one example, a user at a client device 135 may wish to print from an application running on the client device 135, such as a word processing application, a spreadsheet application, or the like. In one example, the client device 135 uses a resident printer driver to send the print job to a print server 101, otherwise known as a virtual endpoint printer. In one example, the print job contains a user identifier (UID) and a user location based on the location of the client device 135. In various examples, the UID may be determined from the login credentials entered by the user to access the client device 135, or client device 135 may be assigned to the user by an IT administrator as is common in a corporate setting. Such an assignment may be based for example, on the MAC address of the client device 135, the serial number of the client device 135, or the like.

The location of the client device 135, and the corresponding location of the user, may be determined in a variety of ways. In one example, the client device 135 may be located by the print server 101 by cross-referencing the Internet Protocol (IP) Address of the client device 135 to a physical location in a database on the print server 101, typically maintained by a system administrator. In one example, as in the case of a wireless client device 135, the client device 135 may include a GPS receiver, and the location of the client device 135 may be determined by the print server 101 by converting GPS coordinates transmitted by the client device 135 to a physical location. In one example, the client device 135 may have a cellular connection to the network, and the location of the client device 135 may be determined by the print server 101 by triangulating cell tower data to determine a physical location of the client device 135. In one example, the client device 135 may include both GPS and cellular capability, such that the print server 101 may use cellular assisted GPS technology to locate the client device 135.

In one example, the client device 135 may be WiFi capable and connected to a wireless LAN or wireless WAN, for example. In such cases, the approximate location of the client device 135 may be determined by the known locations of wireless access points (APs) and signal analysis based on signal strength and time of arrival (TOA), for example. In another example, the client device 135 may be Bluetooth enabled and may have the capability to detect Bluetooth Low Energy (BLE) beacons transmitted by nearby printers 140, and may use that data to inform the print server 101 of printers 140 in the vicinity of client device 135, or to locate client device 135.

In various examples, the spatial resolution of the location information may be set by the system administrator. For example, the location of the user may be resolved to a country, a state, a city, a building, a floor, a section of a floor or an office or meeting room, depending on the need.

When the client device 135 sends the print job to print server 101 along with the UID and the user location, processor 110 may execute example instruction 120 to receive and store the print job, the UID and the user location. The processor 110 may next execute example instruction 121 to determine if the user location is a new user location for the UID. In one example, the processor may make this determination by querying the database 129. For example, database 129 may maintain an historical record of client device locations associated with every UID registered in the system.

If the processor 110 determines that the current user location is a new user location for the UID, then the processor may execute example instruction 122 to query the database 129 to identify at least one printer 140 by PID that are associated with the new user location. In one example, the association may be based on proximity to the user location according to criteria established by a system administrator or the user, for example.

After the at least one associated PID is identified, the processor may execute example instruction 123 to update the database 129 to associate the UID with the new user location and the PIDs associated with the new user location.

In some examples, where the print job stored at the print server 101 has data security parameters, such as encrypted data transmission or encrypted data storage, then processor 110 may execute example instruction 124 to verify the data security capabilities of the at least one associated printer 140. In one example, the processor 110 may query the database 129 for stored information. In another example, the processor may query the associated printers 140 directly.

If printer security levels are validated, the processor 110 may check the available storage at each of the at least one associated printer 140 to determine if there is sufficient storage space to hold the entire print job. Processor 110 may then execute example instruction 125 to adaptively cache the entire print job at the associated printers 140 with sufficient storage space. Alternatively, processor 110 may also store a portion of the print job at any other printers 140 associated with the new user location.

In one example, the user may be presented at the client device with a list of the associated printers 140 that have received the print job, either in whole or in part. In one example, the print job may be held at the printers according to an aging algorithm. For example, a print job held at a printer may be automatically deleted if it is not printed by the user within a predetermined period of time.

After the print job is cached at the at least one associated printer 140, the user may access the print job at one of the associated printers 140 by entering authenticating information at the printer. In various examples, authenticating information may include the user's UID, a biometric input (e.g., fingerprint or retinal scan), a vocal passphrase, or the like. For the purpose of the present disclosure, these user authentication methods are referred to collectively as "UID."

After the user performs the authentication step, the processor 110 may execute example instruction 126 to receive and verify the UID, and example instruction 127 to release the adaptively cached print job at the printer 140 where the user has provided the authentication. In one example, the user may be provided with a list of print jobs cached at the printer, from which the user may make a selection. In one example, after the user selects a print job for printing, the processor 110 may execute example instruction 128 to delete the print job from all of the at least one associated printer 140.

Figure 3:
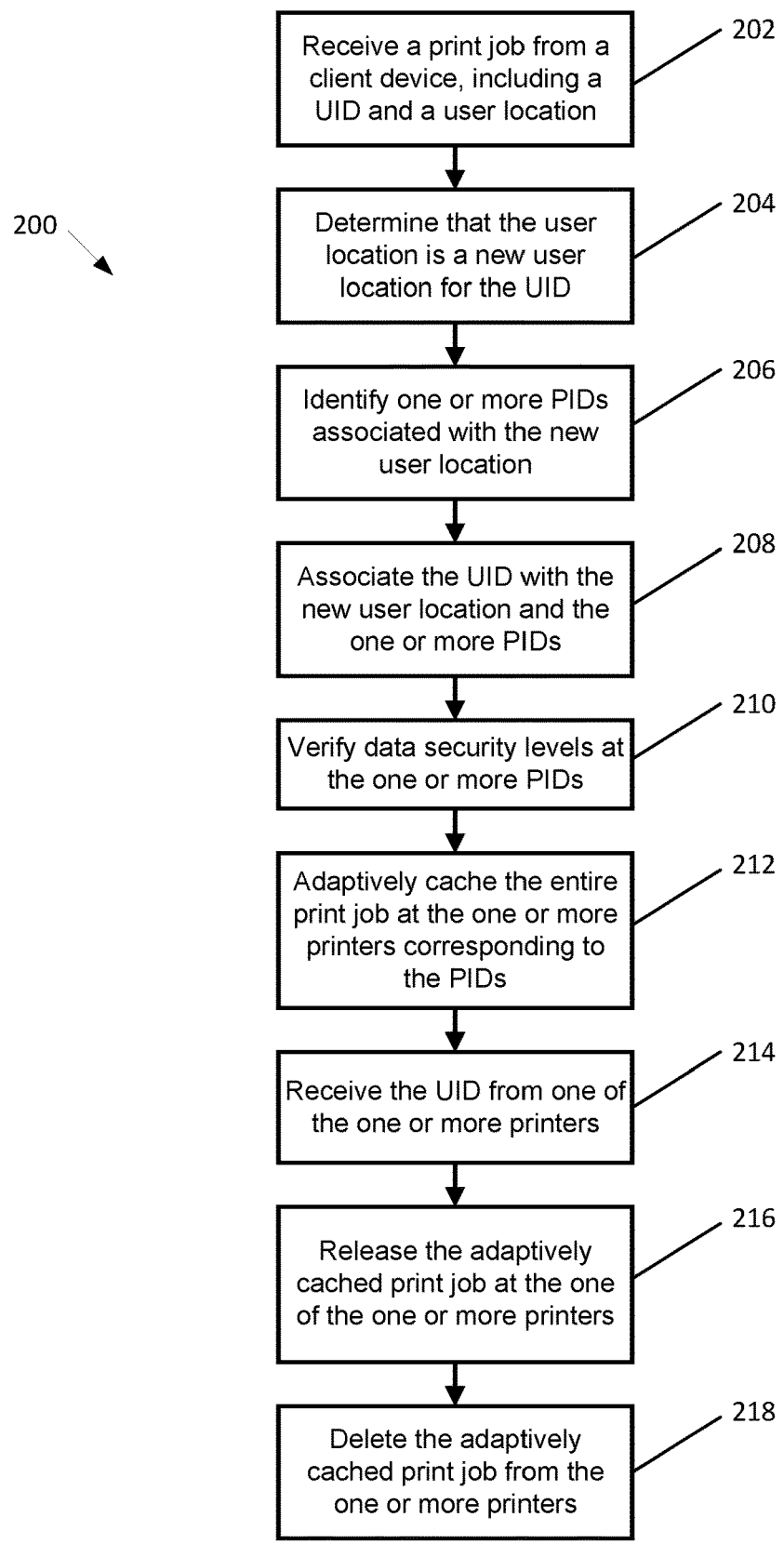
FIG. 3 is flow chart illustrating an example process for adaptive print caching.

Referring now to FIG. 3, a flowchart illustrates an example method 200 for adaptive print caching. The example method 200 may be implemented in a variety of manners, such as in processor 110 in the example system 100 of FIG. 2.

The example method 200 may include receiving a print job from a client device (block 202), such as one of the client devices 135 in FIG. 2, along with a user identifier (UID) and a location of the client device as previously described with respect to example system 100 of FIG. 2.

The example method 200 may further include determining that the user location is a new user location for the UID (black 204) as previously described with respect to the example system 100 of FIG. 2.

The example method 200 may further include identifying at least one printer (e.g., printers 140 in FIG. 2) based on printer identifiers (PIDs) associated with the new user location (block 206) as previously described with respect to the example system 100 of FIG. 2.

The example method 200 may further include associating the UID with the new user location and the at least one PID (block 208) as described above with respect to the example system 100 of FIG. 2.

The example method 200 may further include verifying data security levels to be enforced at the at least one printer (block 210) as previously described with respect to the example system 100 of FIG. 2.

The example method 200 may further include adaptively caching (as defined herein) the entire print job at the at least one printer as previously described with respect to the example system 100 of FIG. 2.

The example method 200 may further include receiving the UID from one of the at least one printer (block 214) by a user's self-authentication activity as previously described with respect to the example system 100 of FIG. 2.

The example method 200 may further include releasing the adaptively cached print job at the printer where the user has provided their UID (block 216) as previously described with respect to the example system 100 of FIG. 2.

And finally, example method 200 may further include deleting the adaptively cached print job from the at least one printer after the print job is printed (block 218) as previously described with respect to the example system 100 of FIG. 2.

Figure 4:
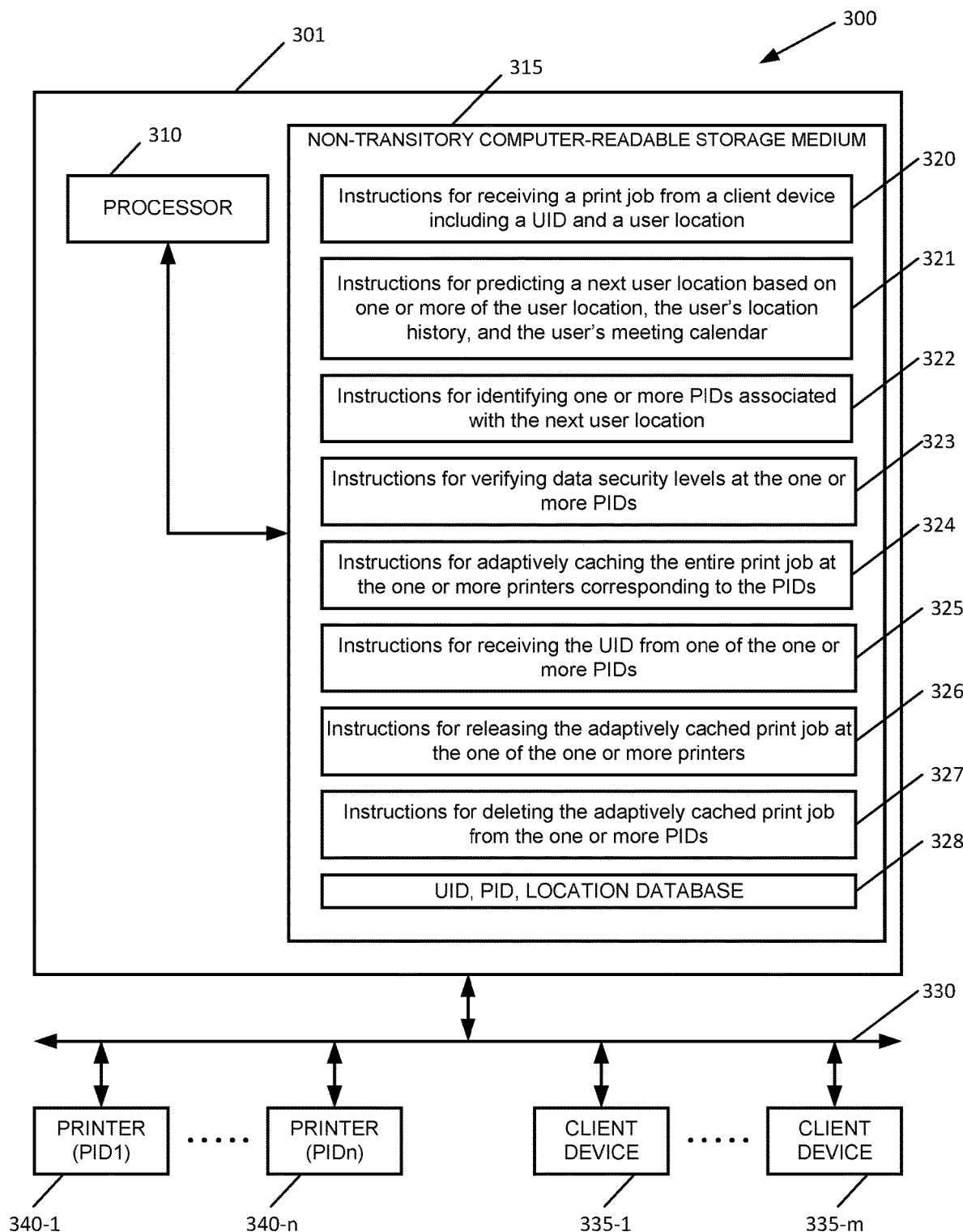
FIG. 4 illustrates a block diagram of another example system with a computer-readable storage medium including instructions executable by a processor for adaptive print caching.

Referring now to FIG. 4, a block diagram of an example system is illustrated with a non-transitory computer-readable storage medium including instructions executable by a processor for adaptive print caching. The example system 300 includes a print server 301 comprising a processor 310 coupled with a non-transitory computer-readable storage medium 315. The non-transitory computer-readable storage medium 315 includes example instructions 320-327 executable by the processor 310 to perform various functionalities described herein. The non-transitory computer-readable storage medium 315 may also store a database, such as database 329 in FIG. 4, described herein. The non-transitory computer-readable storage medium 315 may be similar in all respects to non-transitory computer-readable storage medium 115 described above with respect to system 100 illustrated in FIG. 2, and a detailed description is not provided here to avoid unnecessary repetition. The processor 310 may be similar in all respects to the processor 110 described above with respect to system 100 illustrated in FIG. 2, and a detailed description is not provided here to avoid unnecessary repetition.

System 300 may also include a network 330 to connect print server 301 with other network components such as, for example, a plurality of client devices 335-1 through 335-*m* and a plurality of printers 340-1 through 340-*n*, where m and n are integers representing, respectively, the total number of client devices 135 and the total number of printers 140 on the network, which may vary from time-to-time. Network 330 may be any kind of network such as a wired or wireless local area network (LAN), a wired or wireless wide area network (WAN), a wired or wireless metropolitan area network (MAN), a satellite network, a cellular network or any other network or combination thereof. Client devices 330 may be any type of network connected computer terminal or computing device such as a desktop or laptop computer, tablet device, cell phone, or the like. Printers 340 may be any type of network connected printing device associated with print server 301.

In one example, a user at a client device 335 may wish to print from an application running on the client device 335, such as a word processing application, a spreadsheet application, or the like. In one example, the client device 335 uses a resident printer driver to send the print job to a print server 301, otherwise known as a virtual endpoint printer. In one example, the print job contains a user identifier (UID) and a user location based on the location of the client device 335. In various examples, the UID may be determined from the login credentials entered by the user to access the client device 335, or client device 335 may be assigned to the user by an IT administrator as is common in a corporate setting. Such an assignment may be based for example, on the MAC address of the client device 335, the serial number of the client device 335, or the like.

The location of the client device 335, and the corresponding location of the user, may be determined in a variety of ways. In one example, the client device 335 may be located by the print server 301 by cross-referencing the Internet Protocol (IP) Address of the client device 335 to a physical location in a database on the print server 301, typically maintained by a system administrator. In one example, as in the case of a wireless client device 335, the client device 335 may include a GPS receiver, and the location of the client device 335 may be determined by the print server 301 by converting GPS coordinates transmitted by the client device 135 to a physical location. In one example, the client device 335 may have a cellular connection to the network, and the location of the client device 335 may be determined by the print server 301 by triangulating cell tower data to determine a physical location as is known in the art. In one example, the device 335 may include both GPS and cellular capability, such that the print server 301 may use cellular assisted GPS technology to locate the client device 335.

In one example, the client device 335 may be WiFi capable and connected to a wireless LAN or wireless WAN, for example. In such cases, the approximate location of the client device 335 may be determined by the known locations of wireless access points (APs) and signal analysis based on signal strength and time of arrival (TOA), for example. In another example, the client device 335 may be Bluetooth enabled and may have the capability to detect Bluetooth Low Energy (BLE) beacons transmitted by nearby printers 340, and may use that data to inform the print server 301 of printers 340 in the vicinity of client device 335, or to locate client device 335.

In various examples, the spatial resolution of the location information may be set by the system administrator. For example, the location of the user may be resolved to a country, a state, a city, a building, a floor, a section of a floor or an office or meeting room, depending on the need.

When the client device 335 sends the print job to print server 301 along with the UID and the user location, processor 310 may execute example instruction 320 to receive and store the print job, the UID and the user location.

In one example, after receiving the UID and the user location information based on the location of the client device 335, the processor 310 may execute sample instruction 321 to predict the next location of the user in order to route the print job to at least one printer 340 associated with the next user location. In one example, the processor may make this prediction by querying the database 328. For example, database 329 may maintain an historical record of client device locations associated with the UID. In one example, database 329 may contain a time and date record of every location used by the user over some predetermined past period of time such as a preceding, week, month, or year, for example. The processor may further extrapolate from the user's current position and historical location patterns to predict the next likely locations of the user where the user may want or need access to the print job. In another example, the processor may include access to a user's online meeting calendar to determine the dates, times and locations of meetings that the user is scheduled to attend.

Armed with the predicted next locations of the user, processor 310 may then execute example instruction 322 to query the database 328 to identify at least one printer 340 by PID that are associated with the predicted next user locations. In one example, the association may be based on proximity of printers 340 to the predicted user locations according to criteria established by a system administrator or the user, such as a specific floor, conference room or office for example.

In some examples, where the print job stored at the print server 301 has data security parameters, such as encrypted data transmission or encrypted data storage, then processor 310 may execute example instruction 323 to verify the data security capabilities of the at least one associated printer 340. In one example, the processor 310 may query the database 328 for stored information. In another example, the processor may query the associated printers 340 directly.

If printer security levels are validated, the processor 310 may check the available storage at each of the at least one associated printer 340 to determine if there is sufficient storage space to hold the entire print job. Processor 310 may then execute example instruction 324 to adaptively cache the entire print job at the associated printers 340 with sufficient storage space. Alternatively, processor 310 may also store a portion of the print job at any other printers 340 associated with the predicted next user locations.

In one example, the user may be presented at the client device 340 with a list of the associated printers 340 that have received the print job, either in whole or in part. In one example, the print job may be held at the associated printers according to an aging algorithm. For example, a print job held at an associated printer may be automatically deleted if it is not printed by the user within a predetermined period of time.

After the print job is cached at the at least one associated printer 340, the user may access the print job at one of the associated printers 340 by entering authenticating information at the printer, such as the UID.

After the user performs the authentication step, the processor 310 may execute example instruction 325 to receive and verify the UID, and example instruction 326 to release the adaptively cached print job at the printer 340 where the user has provided the authentication. In one example, the user may be provided with a list of print jobs cached at the printer, from which the user may make a selection. In one example, after the user selects a print job for printing, the processor 310 may execute example instruction 327 to delete the print job from all of the associated printers 340.

Figure 5:
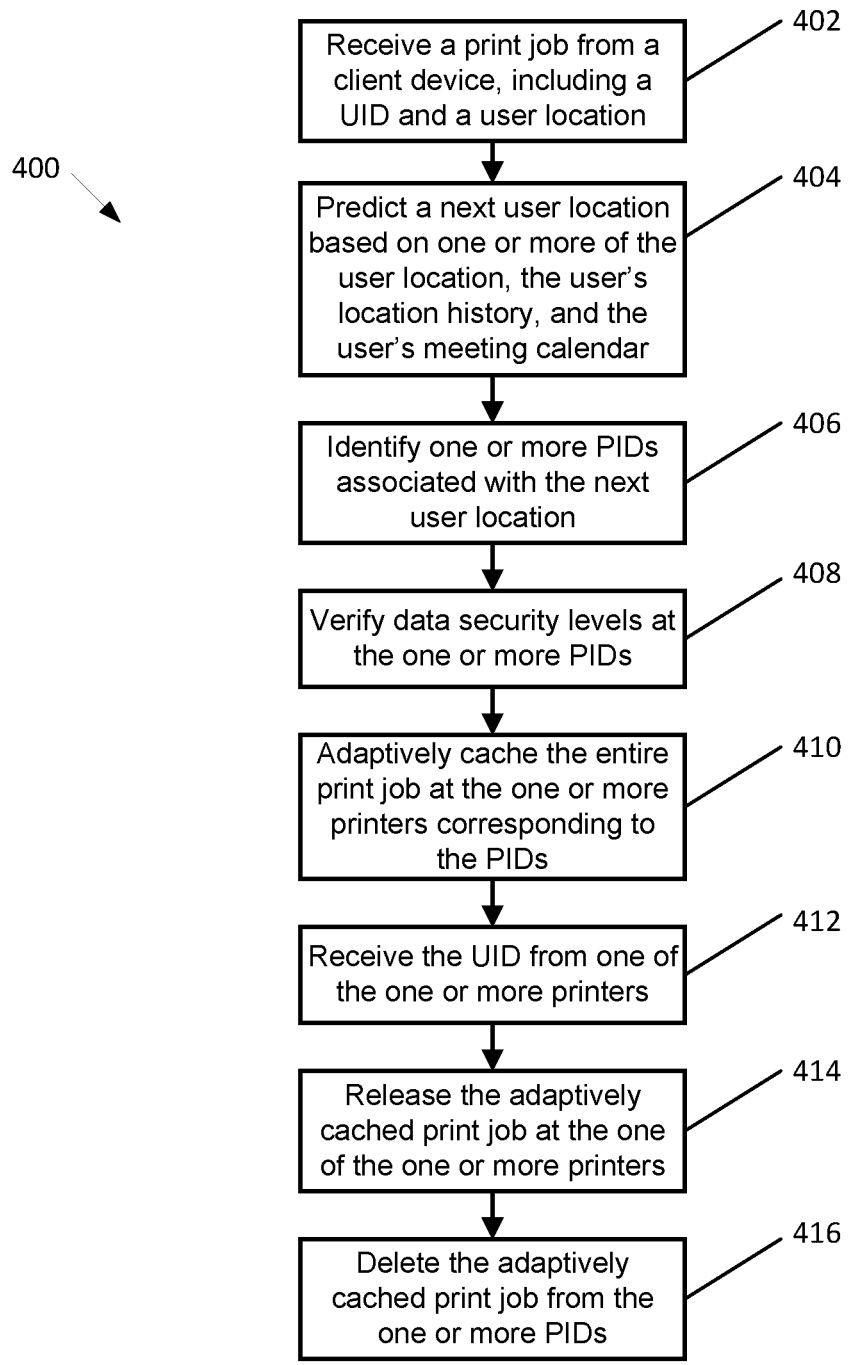
FIG. 5 is a flow chart illustrating another example process for adaptive print caching.

Referring now to FIG. 5, a flowchart illustrates an example method 400 for adaptive print caching. The example method 200 may be implemented in a variety of manners, such as in processor 310 in the example system 300 of FIG. 4.

The example method 400 may include receiving a print job from a client device (block 402), such as one of the client devices 335 in FIG. 4, along with a user identifier (UID) and a location of the user based on the location of the client device 335 as previously described with respect to example system 300 of FIG. 4.

The example method 400 may further include predicting a user's next location based on at least one of the user's current location, the user's location history or the user's accessible meeting calendar (black 404) as previously described with respect to example system 300 of FIG. 4.

The example method 400 may further include identifying at least one printer (e.g., printers 340 in FIG. 4) based on printer identifiers (PIDs) associated with the predicted next user location (block 406) as previously described with respect to example system 300 of FIG. 4.

The example method 400 may further include verifying data security levels to be enforced at the at least one printer (block 408) as previously described with respect to example system 300 of FIG. 4.

The example method 400 may further include adaptively caching (as defined herein) the entire print job at the at least one printer (block 410) as previously described with respect to example system 300 of FIG. 4.

The example method 400 may further include receiving the UID from one of the at least one printer (block 412) by a user's self-authentication activity as previously described with respect to example system 300 of FIG. 4.

The example method 400 may further include releasing the adaptively cached print job at the printer where the user has provided their UID (block 414) as previously described with respect to example system 300 of FIG. 4.

And finally, example method 400 may further include deleting the adaptively cached print job from the at least one printer after the print job is printed (block 416) as previously described with respect to example system 300 of FIG. 4.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A system, comprising:
   a client interface to receive a print job from a client device, wherein the print job comprises a user identifier (UID) and a current user location;
   a controller having an adaptive caching portion to:
   determine that the current user location is a new user location for the UID; and
   in response to the determination of the new user location for the UID,
   identify at least one printer identifier (PID) associated with the new user location; and
   associate the UID with the new user location and the at least one PID; and
   a printer interface to adaptively cache the print job in its entirety at least at one printer corresponding to the at least one PID in response to the determination of the new user location for the UID.

2. The system of claim 1, wherein the printer interface is further to:
hold the print job for authentication of a user based on the UID;
receive the UID from one of the at least one printer;
in response to the received UID, release the adaptively cached print job at the one of the at least one printer; and
delete the adaptively cached print job from the at least one printer.

3. The system of claim 1, wherein the new user location is previously unassociated with a user associated with the UID, and the new user location is determined by the adaptive caching portion from at least one of an Internet Protocol (IP) address of the client device, a GPS location of the client device, a cellular location of the client device, a Bluetooth determined location of the client device, and a WiFi determined location of the client device.

4. The system of claim 1, wherein the adaptive caching portion is further to:
predict a next user location based on the current user location and at least one of a user location history and a meeting calendar of a user;
identify at least one additional PID associated with the predicted user location; and
adaptively cache the print job in its entirety at least at one other printer corresponding to the at least one additional PID.

5. The apparatus of claim 1, wherein the adaptive caching portion is to selectively restrict the adaptive caching to PIDs that enforce specified levels of encryption for data transmission and data storage.

6. A method in a print server, comprising:
receiving a print job from a client device, wherein the print job comprises a user identifier (UID) and a current user location;
determining that the current user location is a new user location for the UID; and
in response to determining the current user location is the new user location for the UID,
identifying at least one printer identifier (PID) associated with the new user location;
associating the UID with the new user location and the at least one PID; and
adaptively caching the print job in its entirety at least at one printer corresponding to the at least one PID.

7. The method of claim 6, further comprising:
receiving authenticating information from one of the at least one printer, wherein a user enters the authenticating information at the one of the at least one printer and the print job is adaptively cached at the at least one printer prior to the user accessing the print job at the one of the at least one printer;
verifying the authenticating information;
in response to the verification, releasing the adaptively cached print job at the one of the at least one printer; and
deleting the adaptively cached print job from the at least one printer.

8. The method of claim 6, wherein the new user location is determined from at least one of:
an Internet Protocol (IP) address of the client device, a GPS location of the client device, a cellular location of the client device, a Bluetooth determined location of the client device, and a WiFi determined location of the client device.

9. The method of claim 6, further comprising:
predicting a next user location based on at least one of the current user location, a user location history and a meeting calendar of a user;
identifying at least one additional PID associated with the predicted user location; and
adaptively caching the print job in its entirety at least at one other printer corresponding to the at least one additional PID.

10. The method of claim 9, further comprising selectively restricting the adaptive caching to PIDs that enforce specified levels of data encryption.

11. A non-transitory computer-readable storage medium encoded with instructions executable by a processor of a computing system, the computer-readable storage medium comprising instructions to:
receive a print job from a client device, wherein the print job comprises a user identifier (UID) and a current user location;
determine that the current user location is a new user location for the UID; and
in response to the determination that the current user location is the new user location for the UID:
identify at least one printer identifier (PID) associated with the new user location;
associate the UID with the new user location and the at least one PID; and
adaptively cache the print job in its entirety at least at one printer corresponding to the at least one PID.

12. The non-transitory computer-readable storage medium of claim 11, further comprising instructions to:
receive the UID from one of the at least one printer;
release the adaptively cached print job at the one of the at least one printer; and
in response to the release, delete the adaptively cached print job at each of the at least one printer.

13. The non-transitory computer-readable storage medium of claim 11, wherein the new user location is determined from at least one of an Internet Protocol (IP) address of the client device, a GPS location of the client device, a cellular location of the client device, a Bluetooth determined location of the client device, and a WiFi determined location of the client device, and comprising instructions to:
query a database to determine that the current user location is the new user location; and
query the database to identify the at least one PID that is associated with the new user location and the corresponding at least one printer.

14. The non-transitory computer-readable storage medium of claim 11, further comprising instructions to:
predict a next user location based on the current user location and a user location history;
identify at least one additional PID associated with the predicted user location; and
adaptively cache the print job in its entirety at least at one other printer corresponding to the at least one additional PID.

15. The non-transitory computer-readable storage medium of claim 14, further comprising instructions to selectively restrict the adaptive caching to PIDs that enforce specified levels of data encryption.

16. The system of claim 1, wherein the least one PID associated with the new user location includes a plurality of PIDs and the at least one printer includes a plurality of printers respectively corresponding to the plurality of PIDs, and the printer interface is to adaptively cache the print job in its entirety at the plurality of printers.

17. The system of claim 16, wherein the printer interface is further to:

receive the UID from one of the plurality of printers;

verify the UID;

in response to the verification, release the adaptively cached print job at the one of the plurality of printers; and in response to the release, delete the adaptively cached print job from the plurality of printers.

18. The method of claim 6, wherein associating the UID with the new user location and the at least one PID includes creating a new association between the UID, the new user location, and the at least one PID in a database.

19. The method of claim 6, further including:

querying a database to determine that the current user location is the new user location; and querying the database to identify the at least one printer by the at least one PID that is associated with the new user location, wherein the at least one PID is associated with the new user location based on a proximity of the current user location and an established criteria; and wherein associating the UID with the new user location and the at least one PID includes updating the database to associate the UID and the at least one PID with the new user location.

20. The method of claim 6, further including, in response to determining the new user location;

verifying data security capabilities of the at least one printer based on data security parameters; and verifying sufficient storage space on the at least one printer to hold the entire print job.

* * * * *